United States Patent
Mazquiaran Mendia

(10) Patent No.: US 11,059,245 B2
(45) Date of Patent: Jul. 13, 2021

(54) REPAIRED PLASTIC PRODUCT

(71) Applicant: PLASTIC REPAIR SYSTEM 2011, S.L., Pamplona (ES)

(72) Inventor: Juan Ramon Mazquiaran Mendia, Pamplona (ES)

(73) Assignee: PLASTIC REPAIR SYSTEM 2011, S.L., Pamplona (ES)

( * ) Notice: Subject to any disclaimer, the term of this patent is extended or adjusted under 35 U.S.C. 154(b) by 0 days.

(21) Appl. No.: 16/301,119

(22) PCT Filed: May 8, 2017

(86) PCT No.: PCT/ES2017/070284
§ 371 (c)(1),
(2) Date: Nov. 13, 2018

(87) PCT Pub. No.: WO2017/194803
PCT Pub. Date: Nov. 16, 2017

(65) Prior Publication Data
US 2019/0134929 A1 May 9, 2019

(30) Foreign Application Priority Data
May 13, 2016 (ES) .............. ES201630613U

(51) Int. Cl.
*B29C 73/02* (2006.01)
*G01N 21/90* (2006.01)
(Continued)

(52) U.S. Cl.
CPC ............. *B29C 73/02* (2013.01); *G01N 21/90* (2013.01); *B29K 2023/06* (2013.01);
(Continued)

(58) Field of Classification Search
CPC B29C 73/02; B29K 2023/06; B29K 2023/12; B29K 2027/06; B29K 2055/02;
(Continued)

(56) References Cited

U.S. PATENT DOCUMENTS 3,043,175 A * 7/1962 Gallob .................... B29C 70/58
100/283
4,260,439 A * 4/1981 Speer .................... B29C 43/021
156/256
(Continued)

FOREIGN PATENT DOCUMENTS

CN 2688623 Y 3/2005
EA 016284 B1 3/2012
(Continued)

OTHER PUBLICATIONS

International Search Report dated Aug. 4, 2017 for PCT/ES2017/070284 and English translation.

*Primary Examiner* — Sang H Nguyen
(74) *Attorney, Agent, or Firm* — Lucas & Mercanti, LLP

(57) ABSTRACT

The invention relates to a repaired plastic product comprising a body (1) made from a first plastic material (2) and at least one repaired segment having a second plastic material (3) comprising particles designed to be visible under the application of light (4) comprised in the infrared or ultraviolet electromagnetic spectrum.

2 Claims, 2 Drawing Sheets

(51) Int. Cl.
  *B29K 23/00* (2006.01)
  *B29K 27/06* (2006.01)
  *B29K 55/02* (2006.01)
  *B29K 77/00* (2006.01)

(52) U.S. Cl.
  CPC ...... *B29K 2023/12* (2013.01); *B29K 2027/06* (2013.01); *B29K 2055/02* (2013.01); *B29K 2077/00* (2013.01); *B29K 2995/0018* (2013.01)

(58) Field of Classification Search
  CPC ............... B29K 2077/00; G01N 21/10; B29L 2995/0018
  See application file for complete search history.

(56) References Cited

U.S. PATENT DOCUMENTS

| | | | | |
|---|---|---|---|---|
| 4,409,270 A | * | 10/1983 | Faber | B29C 73/02 156/94 |
| 5,248,521 A | * | 9/1993 | Yamane | C09K 3/14 427/140 |
| 5,427,825 A | * | 6/1995 | Murnick | B28B 11/044 427/555 |
| 6,174,392 B1 | * | 1/2001 | Reis | B29C 73/06 156/58 |
| 6,180,245 B1 | * | 1/2001 | Janssen | B32B 17/10963 428/426 |
| 6,196,744 B1 | * | 3/2001 | Landry | B05C 17/002 401/198 |
| 6,287,405 B1 | * | 9/2001 | Stevenson | B29C 73/02 156/94 |
| 6,374,893 B1 | * | 4/2002 | Behl | B29C 65/10 156/497 |
| 7,981,229 B2 | * | 7/2011 | Hood | B29C 73/10 138/97 |
| 9,418,416 B2 | * | 8/2016 | Milne | G06T 7/246 |
| 9,507,232 B2 | * | 11/2016 | Rozbicki | G01N 21/8851 |
| 10,232,573 B2 | * | 3/2019 | Siegfried Herrmann | B29C 69/001 |
| 2002/0132871 A1 | * | 9/2002 | Colton | C09D 4/06 522/7 |
| 2002/0144921 A1 | * | 10/2002 | Downing | B29C 73/10 206/390 |
| 2004/0084120 A1 | | 5/2004 | Arnold et al. | |
| 2004/0131769 A1 | * | 7/2004 | Saxon | B29C 73/02 427/140 |
| 2005/0011603 A1 | * | 1/2005 | Button | C03C 17/3405 156/94 |
| 2006/0072111 A1 | * | 4/2006 | Budd | G01N 21/9027 356/427 |
| 2006/0079040 A1 | * | 4/2006 | Tanaka | H01L 21/2026 438/166 |
| 2009/0148606 A1 | * | 6/2009 | Norville | B24B 13/00 427/307 |
| 2010/0003424 A1 | * | 1/2010 | Kim | B32B 17/10963 427/595 |
| 2012/0244786 A1 | * | 9/2012 | Norville | B24B 1/00 451/54 |
| 2012/0288623 A1 | * | 11/2012 | Boler | B24D 15/04 427/140 |
| 2013/0050992 A1 | * | 2/2013 | Schneider | G02B 6/0031 362/100 |
| 2013/0294644 A1 | * | 11/2013 | Cork | B29C 73/10 382/103 |
| 2015/0027994 A1 | * | 1/2015 | Bruck | B23K 26/34 219/73.21 |
| 2015/0338296 A1 | | 11/2015 | Georgeson et al. | |
| 2017/0326761 A1 | * | 11/2017 | Springer | B32B 15/20 |

FOREIGN PATENT DOCUMENTS

| | | | | |
|---|---|---|---|---|
| ES | 2388410 A1 | 10/2012 | | |
| GB | 1540456 A | 2/1979 | | |
| JP | 2002169469 A | 6/2002 | | |
| JP | 2011158503 A | 8/2011 | | |
| WO | WO-9835549 A1 | * | 8/1998 | ........ B05C 17/002 |
| WO | 2005085074 A1 | 9/2005 | | |
| WO | 2009114686 A1 | 9/2009 | | |

* cited by examiner

REPAIRED PLASTIC PRODUCT

CROSS REFERENCE TO RELATED APPLICATION

This Application is a 371 of PCT/ES2017/070284 filed on May 8, 2017 which, in turn, claimed the priority of Spanish Patent Application No. U 201630613 filed on May 13, 2016, both applications are incorporated herein by reference.

FIELD OF THE ART

The present invention relates to the repair of plastic parts or products, particularly boxes, street containers, street furniture, or any other plastic element. Said repair is performed by means of welding, providing a material comprising luminous particles which allow determining if a product has been repaired.

STATE OF THE ART

A large amount of products manufactured from plastic material, mainly from simple thermoplastic polymers, which are commonly used in manufacturing boxes, vessels, urban waste containers, and similar products, is available today.

Several repair methods are furthermore known for cases in which one of the mentioned products has a broken area, such as a crack or a complete separation of a portion of the product, for example, and it is more cost-effective to repair it than to replace it with a new product.

One of the known methods for repairing broken areas in products of this type is based on attaching the broken portions by means of external parts which are fixed to the product through screws, rivets, or similar elements. Although this form of repair keeps the product in a functional state, the product has an unsatisfactory finish, and the products repaired with this method furthermore lack a suitable leaktightness, so if there is a liquid inside said products, the liquid will seep out through the repaired area, which is particularly relevant if the product is a vessel, or even in urban waste containers.

Likewise, another repair method in which a welding material that is similar or identical to the plastic material of the product is provided in the area of rupture is known. After drying and polishing the section where the welding material has been provided, the repaired product is as it was in its original state, and for products such as street containers, the leaktightness thereof is maintained.

Nevertheless, this last method has the drawback that once the product has been repaired, it is extremely difficult or even impossible to check if the product is new or has been somehow subject to repair, so products can be sold as if they are new when they may have actually been subject to repair.

There is therefore a need for a plastic product which has been repaired such that the product comprises a suitable leaktightness and a proper finish, but which at the same time constitutes a product in which it can readily be detected whether it has been subject to some type of repair.

OBJECT OF THE INVENTION

The invention proposes a plastic product which has been repaired such that it comprises a suitable finish and leaktightness and in which it can be detected whether the product has been subject to repair.

Said repaired plastic product comprises a body made from a first plastic material comprising at least one repaired segment having a second plastic material comprising particles designed to be visible under the application of light comprised in the infrared or ultraviolet electromagnetic spectrum.

In that sense, although it is not possible to know under the naked eye if the product object of the invention has been repaired, by means of using a light-emitting apparatus which emits light comprised in the infrared or ultraviolet electromagnetic spectrum, such as an infrared or ultraviolet light flashlight, for example, it is possible to apply a light of this type on the product and discover the segments where repairs have been made. Both cracks and a complete separation of a section of the body of the product may have occurred in said rupture segments.

The second plastic material is selected from the group comprising polyethylene, polypropylene, acrylonitrile butadiene styrene, polycarbonate, polyamide, polyvinyl chloride, or any one mixture of these compounds or the derivatives thereof.

Likewise, depending on the repaired plastic product, the first plastic material and the second plastic material can be the same plastic material or two different materials.

A repaired plastic product which is completely recovered both functionally and esthetically to continue serving its intended function, and which in turn can be readily identified as a repaired product, preventing it from being confused with a new product, is thereby obtained.

DETAILED DESCRIPTION OF THE INVENTION

Figure 1:
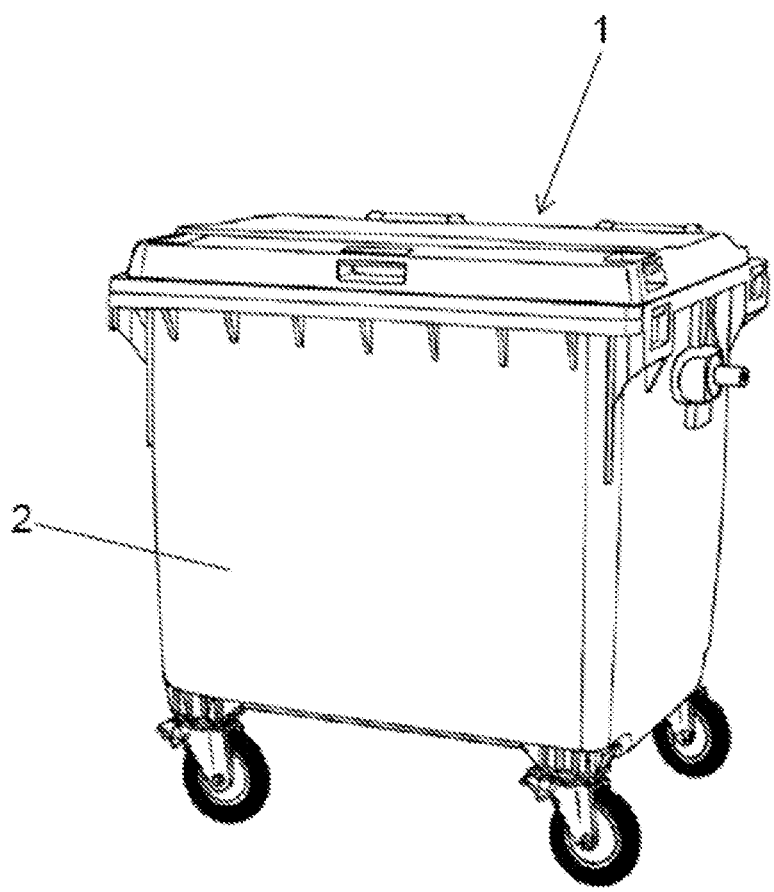
FIG. 1 shows an example of a repaired plastic product according to the invention, specifically an urban waste container.

A repaired plastic product according to the invention, for example, an urban waste container, is described below. However, it is obvious that said repaired product can be of any other type of plastic article.

Said product comprises a body (1) made from a first plastic material (2). When it is detected that said product must be repaired, the possible segments where ruptures occurred must first be taken into account, and each segment must be examined to check if the product has a crack or has sustained the complete separation of a section thereof.

In the even that a crack has occurred in the rupture segment, one part of the crack is fixed to the other part by means of fastening elements (such as clamps or an equivalent tool, for example), so that the body (1) adopts its initial shape as much as possible.

After that, edges defined by the open parts of the crack are chamfered, such that a housing intended for receiving a second plastic welding material (3) is determined. Said housing is then preheated until it is in a plastic state. At that point, the second plastic welding material (3) is poured onto the mentioned housing in molten state so as to weld the two or more parts of the rupture present in the section.

Once said second plastic material (3) has been poured, the rupture segment must be pressed with a roller-like tool until the surface of the product becomes as smooth as possible, and once both the first and the second plastic materials (2 and 3) present in the segment have cooled down, excess second plastic material (3) is removed by means of sanding or an equivalent process.

The surface finish of the body (1) of the repaired plastic product is therefore equivalent to that of a new product, said repaired body (1) maintains suitable leaktightness properties, and furthermore it is not possible to readily distinguish under the naked eye whether the product is a new or repaired product.

On the other hand, in the event that the complete separation of a section of the body (1) has occurred in the rupture segment, the rupture segment is first cut into a geometrical shape to be selected, such as a rectangular or circular shape, for example. After that, a template having a shape that matches the cut-out shape in the segment, made from the same first plastic material (2) as the body (1), is fitted therein.

Once the template has been placed in the rupture segment, the same steps of the repair method described for the instance of ruptures due to cracks are followed.

The indicated second plastic material (3) can be polyethylene, polypropylene, ABS (acrylonitrile butadiene styrene), polycarbonate, polyamide, polyvinyl chloride, or any mixture of these compounds or the derivatives thereof. Likewise, this second plastic material (3) comprises particles designed to be visible under the application of light (4) comprised in the infrared or ultraviolet electromagnetic spectrum, produced by a light-emitting apparatus (5) which emits ultraviolet or infrared light, such as an ultraviolet or infrared light flashlight, for example.

Said particles are not visible when viewed under the naked human eye, so one would be unable to tell without particular tools whether or not the body (1) of the product has been repaired. To that end, through the light-emitting apparatus (5), light (4) must be applied over the entire body (1) until at least one of the rupture segments which has been repaired is located.

FIG. 1 shows the body (1) of the repaired plastic product object of the invention (in this specific instance, an urban waste container), in which it is impossible to distinguish under the naked eye if the product is a new product or if any segment thereof has been subject to repair.

Figure 2:
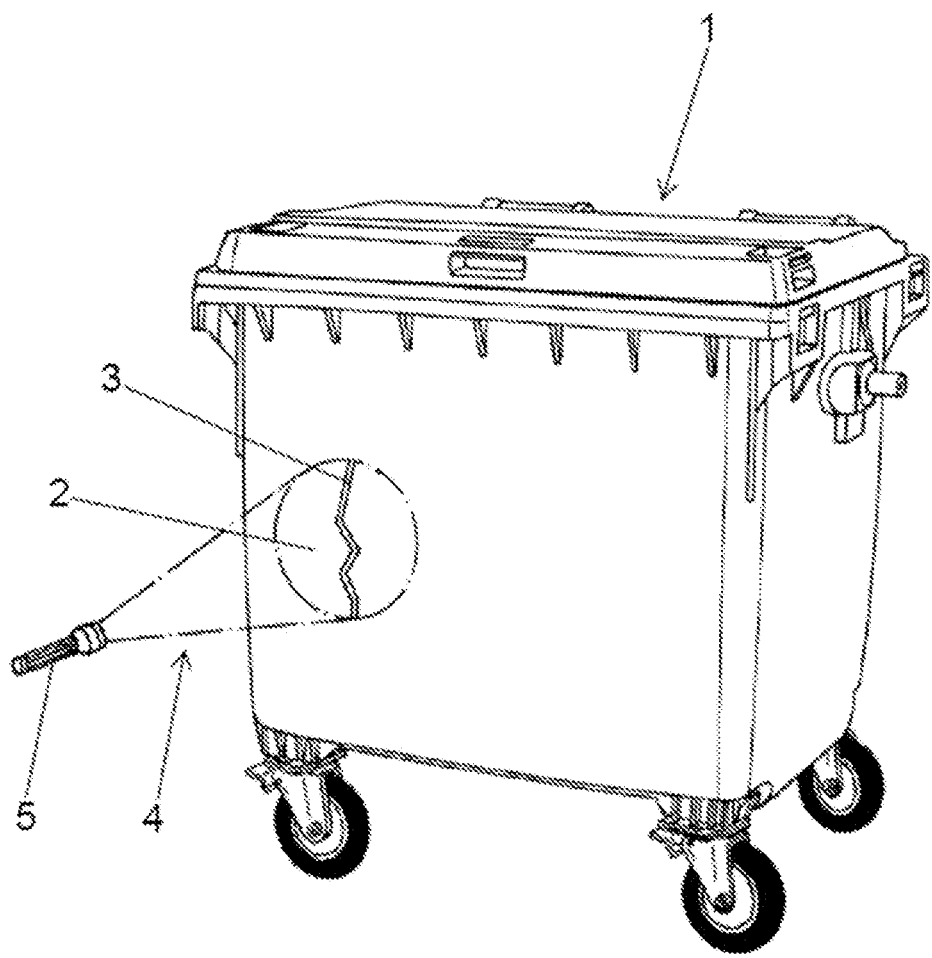
FIG. 2 shows the urban waste container of FIG. 1, on which a light which allows viewing particles comprised in a second plastic material is applied, making it possible to demarcate a repaired segment thereof.

Likewise, FIG. 2 shows the same product of FIG. 1 on which ultraviolet light (4) is applied over a segment of the body (1) by means of a light-emitting apparatus (5), making the particles of the second plastic material (3) visible.

The invention claimed is:

1. A repaired plastic product comprising:
   a body made from a first plastic material, wherein the first plastic material of the body has a repaired segment;
   at least one repaired segment having a second plastic welding material welded to the first plastic material, wherein the first and second materials have cooled in the at least repaired segment and a sanding processing for removing an excess thickness of the second plastic material,
   wherein the second plastic welding material comprises visibly detectable particles, and wherein the first and second plastic materials are different materials; and
   a light-emitting apparatus for emitting ultraviolet electromagnetic spectrum light visibly detecting the particles on a surface finish of the repaired plastic product, wherein the surface finish of the repaired plastic product is equivalent to a new body product for maintaining leaktight properties of the body.

2. The repaired plastic product according to claim 1, wherein the second plastic material is selected from the group comprising polyethylene, polypropylene, acrylonitrile butadiene styrene, polycarbonate, polyamide, polyvinyl chloride, or any one mixture of these compounds or the derivatives thereof.

* * * * *